R. P. LANSING

ENGINE STARTER

June 14, 1932.

Re. 18,496

Original Filed Jan. 20, 1926 3 Sheets-Sheet 1

Witness
Martin H. Olsen.

Inventor
Raymond P. Lansing
By Rector, Hibben, Davis & Macauley
His Attys

R. P. LANSING

June 14, 1932.

ENGINE STARTER

Re. 18,496

Original Filed Jan. 20, 1926 3 Sheets-Sheet 2

Witness
Martin H. Olsen

Inventor
Raymond P. Lansing
By Rector, Hibben, Davis & Macauley
His Attys.

R. P. LANSING
June 14, 1932.
ENGINE STARTER
Re. 18,496
Original Filed Jan. 20, 1926 3 Sheets-Sheet 3
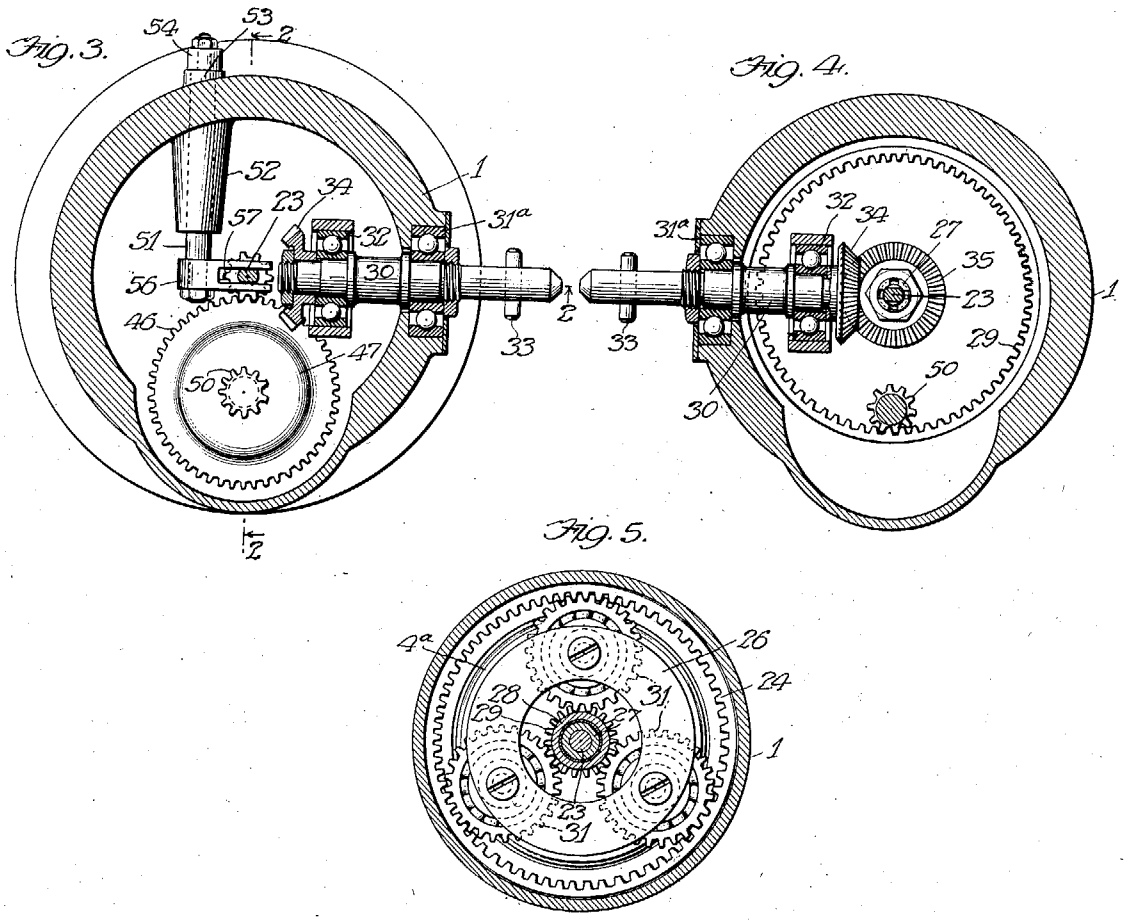
Witness
Martin H. Olsen.
Inventor
Raymond P. Lansing
By Rector, Hibben, Davis & Macauley
His Attys Reissued June 14, 1932 Re. 18,496

UNITED STATES PATENT OFFICE

RAYMOND P. LANSING, OF MONTCLAIR, NEW JERSEY, ASSIGNOR TO ECLIPSE MACHINE COMPANY, OF ELMIRA, NEW YORK, A CORPORATION OF NEW YORK

ENGINE STARTER

Original No. 1,691,820, dated November 13, 1928, Serial No. 82,394, filed January 20, 1926. Application for reissue filed November 13, 1930. Serial No. 495,524.

My invention relates to engine starting apparatus for the starting of engines, such as internal combustion engines, and more particularly but not necessarily airplane engines, and the object thereof is to provide a simple, efficient and reliable apparatus capable of either manual or power operation or both and characterized also by the provision of simple and efficient inertia means which is actuated by such power or manual means for the accumulation and storing of energy which is thereupon utilized by the application thereof to the engine for cranking the same. Speaking more specifically, the main object of my invention is to provide a very compact and most efficient apparatus, providing particularly for the greatest possible compactness for installation purposes and yet maintaining the greatest efficiency in operation, especially in the case of airplane engines wherein the installation dimensions are very limited.

Figure 1:
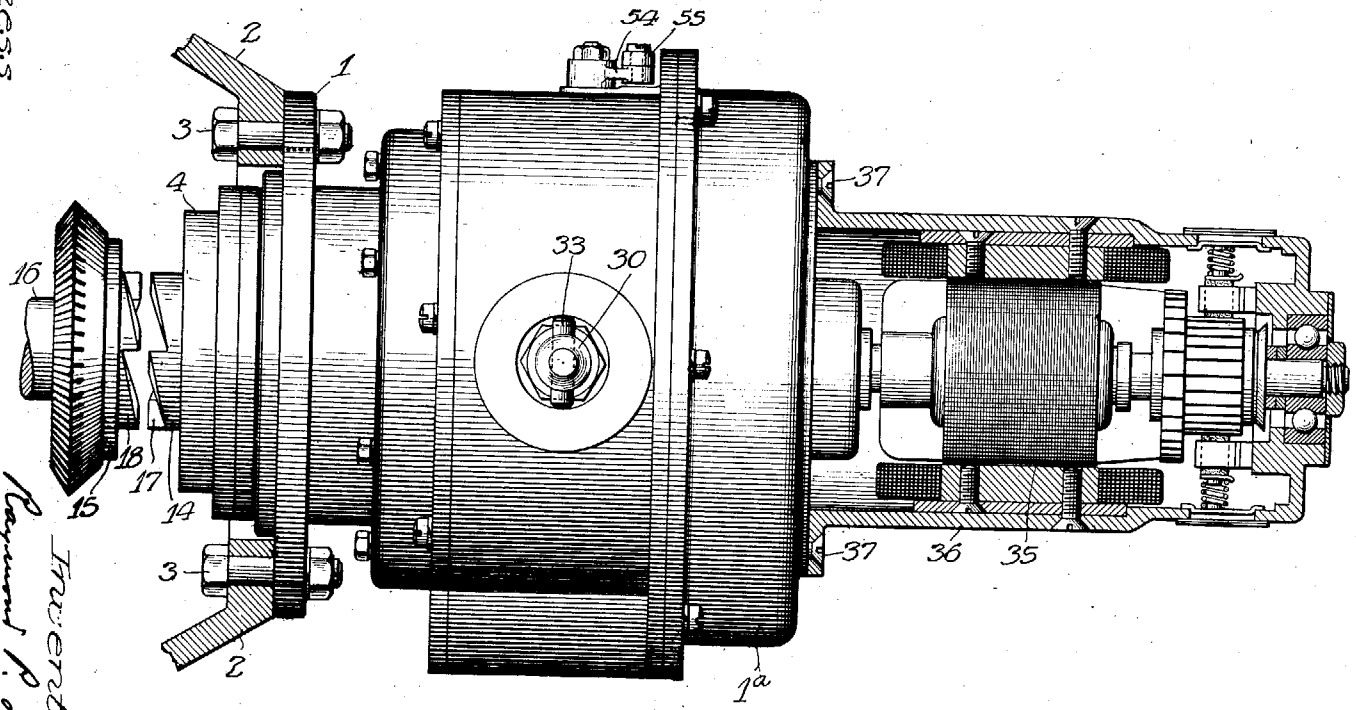
Figure 2:
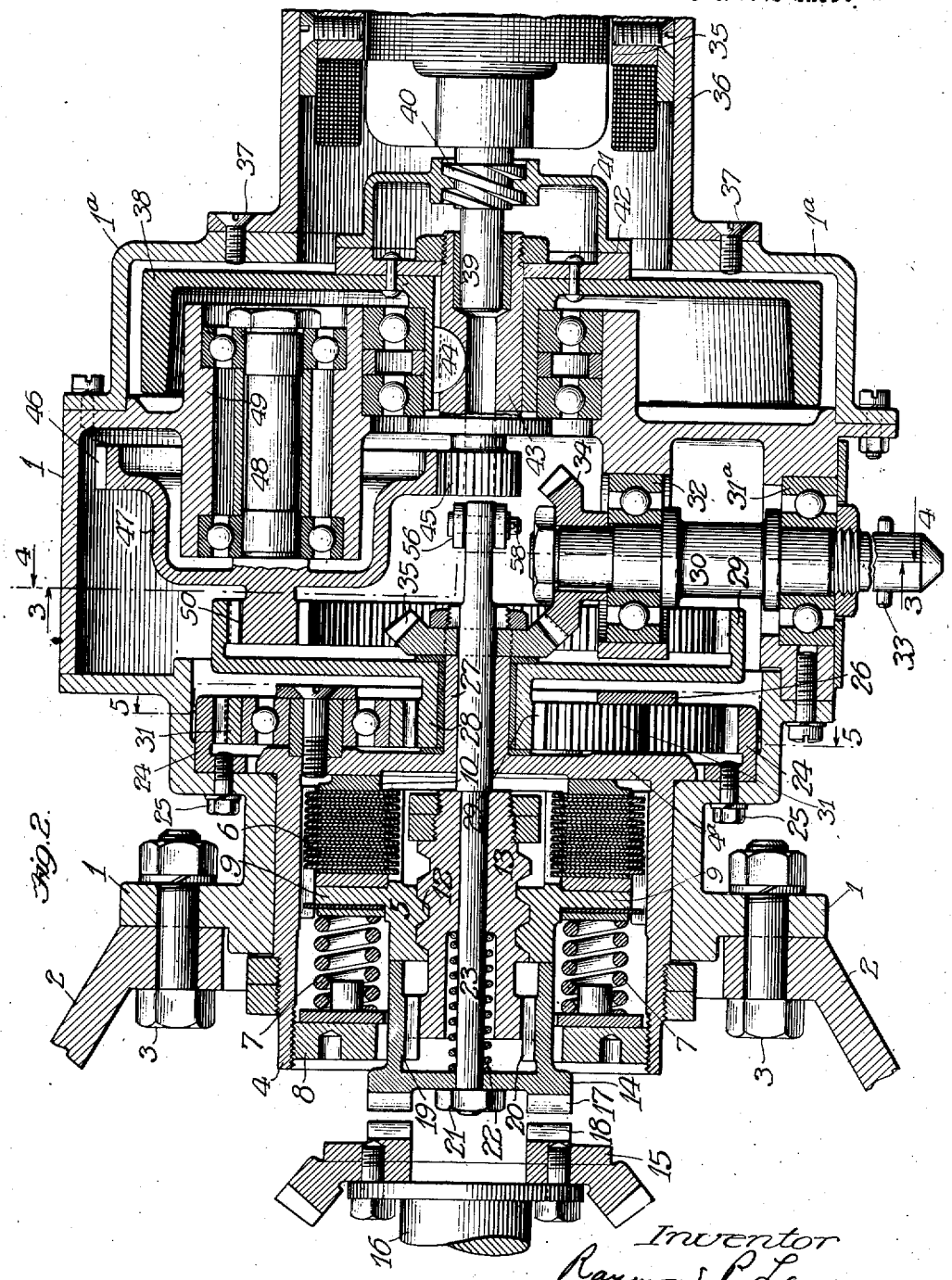

In the drawings, Figure 1 is an elevation partly in section of an apparatus embodying my invention; Fig. 2 a section on the irregular section line 2—2 of Fig. 3; Figs. 3 and 4 sections on the same section line of Fig. 2 marked 3—3 and 4—4 but looking in opposite directions as indicated by the arrows; and Fig. 5 a section on the line 5—5 of Fig. 2.

My apparatus comprises a transmission or drive having an element hereinafter designated a driving member adapted to engage a member of the engine to be started, reduction means such as gearing, an inertia means such as a flywheel, and means for actuating such drive, gearing and flywheel. In the present instance, I have shown two such actuating means, to wit power means such as an electric motor and manual means including a cranking shaft, either one of which two means may be dispensed with and removed from the apparatus if desired, although I prefer the complete apparatus as herein illustrated, that is, with both the power means and the manual means employed. For the purpose of a clear and definite description of my invention and for convenience, I will describe my apparatus as used in connection with airplane engines, although it will be understood that the same is not limited thereto in its application.

First describing the transmission or drive, the same is located within a main casing 1 which is suitably supported as by being detachably connected with the crankcase 2 of the engine as by means of bolts 3, a small portion of which crankcase is illustrated. Within the casing, there rotates a driving barrel 4 and a nut 5 located and operating concentrically therewithin and operatively connected with the barrel by a yieldable driving connection which is herein the form of a friction clutch 6. This clutch is composed of two sets of disks which are splined respectively to the interior of the barrel and to a right-hand extension (Fig. 2) of the nut. The proper pressure for the disks is provided by a series of springs 7 located within the barrel and such pressure is regulated by the adjustable ring 8 screwing in the interior of the barrel. The thrust of these springs is against the flange 9 of nut 5 and tends to force such nut inwardly and consequently force the clutch disks against the spacing ring 10 and into frictional contact with each other. The nut 5 is provided with internal long lead threads 12 on which is threaded a screw shaft 13 constituting the main portion of the driving member whose other principal portion is a clutch member 14 adapted to engage a member of the engine to be started, such as the correpsonding clutch member 15 forming a part of or secured to a rotatable part of the engine such as the crank shaft 16 thereof. The element 14 is in the form of a disk having clutch jaws 17 adapted to engage complementary clutch jaws 18 on the engine member and provided with a hub or sleeve portion 19 which is splined to the outer end of the screw shaft by means of splines 20, whereby element 14 and screw shaft 13 have a relative longitudinal movement of limited degree independent of each other. The element 14 is held in outward position with a yielding pressure in suitable manner as by means of a coil spring 22 which bears at its outer end against the bottom of sleeve 19 and at its inner end against the bottom of a socket formed in the outer end of the screw shaft.

The outward movement of element 14 is limited by the head or nut 21 on the outer or left-hand end of an operating rod 23 which passes centrally through the driving parts and centrally through the reduction gearing hereinafter described.

Next referring to the reduction means, the same is in the form of gearing contained within the main casing 1 by which such gearing is supported and in which it has its bearings. A stationary internal gear 24 is secured to casing 1 in suitable manner as by screws 25 and with the same there meshes a series of three planetary gears 31. These gears are journaled between the end plate 4*a* and a plate 26 parallel therewith. This end plate 4*a* has a hub 27 extending laterally to the right in Fig. 1 and on the same there is loosely mounted a hub 28 of the internal gear 29. This reduction gearing is operatively connected respectively with the manual means and with the power means in the following manner:

Referring to the manual means, the same comprises a cranking shaft 30 entering through one side of the casing 1 and having suitable bearings 31*a* and 32 therein. This shaft is provided with suitable means, such as the pins 33 for engagement with an ordinary hand crank. At its inner end, the cranking shaft is provided with a bevel pinion 34 secured thereto and meshing with a corresponding bevel pinion 35 which is secured to the hub 27 of the barrel 4.

Next referring to the power means or electric motor and its operating connections and also referring to the inertia means which is combined therewith, the electric motor 35 is removably secured by means of the screws 37 to a cover plate 1*a* which encloses the inertia means which is here in the form of a flywheel 38 and also the bearing extensions of the casing 1. The armature shaft 39 of the motor is operatively connected with the flywheel, and consequently to the reduction gearing in such manner that the torque of the motor is transmitted in one direction only, that is from the motor to the flywheel and the gearing. To this end, the armature shaft is provided with a screw threaded portion 40 on which is threaded a shell 41 whose marginal flange portion is adapted to be clamped in automatic manner against the plate 42 secured to the web of the flywheel 38 whenever the motor is energized. This flywheel is splined to a shaft 43 and also keyed thereto by key 44. This shaft 43 also provides a bearing for the outer end of the armature shaft and for this purpose such shaft 43 has a socket at one end to receive the armature shaft. The shaft 43 is provided at one end with a pinion 45 which meshes with the gear teeth 46 of the bell shaped gear 47 whose central shaft 48 is mounted within the bearing 49 of the casing 1. This gear 47 is provided at one end with a pinion 50 which meshes with the internal gear 29.

The rod 23 is adapted to be manually operated by suitable connections extending through the side of casing 1. As shown in Fig. 3, a rock shaft 51 extends through a bearing 52 therein and is provided at its outer end with a collar 53 secured thereto which collar has a crank arm 54 which may be operated directly by hand or may be provided with an actuating rod 55 if desired, such rod extending to any suitable point within easy reach of the operator. The inner end of the rock shaft is provided with a crank arm 56 having a slot 57 through which the rod 23 passes and a pin 58 securing such rod to the crank arm.

Describing a cycle of operation and beginning with their parts in the normal position shown in Fig. 2 and first describing such operation when the electric motor is employed as the actuating means for the flywheel and the drive, when the motor is energized the clamping member 41 will be automatically advanced into clamping position with respect to the flywheel plate 42 and rapid driving relationship thereby established between the motor and the flywheel 38. The flywheel is thereupon rotated and likewise the torque is transmitted to the shaft 43, pinion 45, gear 47 and pinion 50 to the reduction gearing composed of the gear 29, planetary gears 31 and thence to the barrel 4 and through the clutch 6 to the nut 5 and screw shaft 13. However, this screw shaft will be merely rotated and will not be advanced as its rotation is comparatively slow because of the reduction gearing. When the rotation of the flywheel has reached the predetermined degree which in practice is between fifteen thousand and twenty thousand R. P. M., the current may or may not be cut off from the electric motor as desired by the operator and the rod 23 is operated by being thrust to the left in Fig. 2 with the result that the screw shaft 13 will be caused by such pressure and by automatic action between its screw threads and those of the nut 5 to be advanced thereby bringing the clutch jaws 17 and 18 into engagement. The engine member will thereby be rotated and the engine will be cranked. When the engine operates under its own power, the driving member will be automatically disengaged through the screw action between the screw shaft 13 and the nut 5.

The normal position of the sleeve 19 of the clutch member 14, which forms a part of the driving member is in contact with the nut 5, as shown in Fig. 2 and the inner movement of such sleeve is thereby limited but after the screw shaft 13 has been advanced towards the left in Fig. 2 and in case of abutment of the clutch jaws 17 and 18, such clutch member 13 will be momentarily stopped in its advance, but the screw shaft 13 will continue to advance but as soon as register between the clutch jaws 17 and 18 occurs upon the rotation of the clutch member, the spring 22 will snap such clutch member into full engagement with the engine member. This functioning of the parts is permitted by reason of the relative longitudinal movement of the screw shaft and its clutch member 14.

Next describing a cycle of operation when the manual means is the source of power, when the cranking shaft 30 is rotated by an ordinary hand crank the bevel gear 34 will be rotated and thereby the bevel gear 35 and the hub 27 and entire barrel 4 of the drive. At the same time, the planetary gears will cause rotation of the internal gear 29 which in turn will rotate the transmission gearing composed of the pinion 50, gear 47, pinion 45 and shaft 43, with the result that the flywheel 38 will be rapidly rotated. At this time, the electric motor will be disconnected inasmuch as the clamping member 41 is adapted to transmit torque in one direction only. When the desired or predetermined R. P. M. of the flywheel is reached, the operator will operate the rod 23 in the manner and with the result hereinbefore explained in the case of the use of the motor as the actuating means.

The starting apparatus above described is very compact and efficient, and also well balanced and the various moving parts are arranged in concentric relation and in alinement with the rod 23, shaft 43, and armature shaft 39 as the center. Moreover, the different units such as the drive, reduction gearing and transmission and also the manual means are located in a single casing and the inertia means or flywheel is arranged in a supplemental casing. Furthermore, the electric motor is detachably connected to the supplemental casing and operatively connected to the apparatus therewith in such manner that it may readily be removed from the apparatus if desired whereupon such apparatus becomes operable by manual means only.

The casing is advantageously made in the two parts shown, one part containing the assembly of drive proper and planetary gearing and the other assembly of spur gearing and flywheel. Both assemblies are individually or separately made, and are then bolted together, the operative connection being made through the meshing of the spur pinion with the internal spur gear. This construction of the casing in two such parts has resulted in considerable and material advantage over the use of a single casing.

The particular construction and arrangement of the friction clutch herein shown and described, especially the means and manner of applying the spring pressure to its clutch plates, are of importance and advantage. In the present instance, the clutch is mounted and constrained within the barrel and the spring pressure passes through the clutch plates and is resisted by the closed end of such barrel. The spring reaction is taken by the adjustment nut and endwise constrainment is effected by the inclusion of the outwardly projecting flange of the nut member. This particularly enables the use of a shorter and lighter nut, no extension thereof being required within the spring assembly, wherefore a greater section is provided for the driving member whose clutch member then occupies space heretofore occupied by the extension of the nut, thereby allowing greater size and strength for the driving member.

I claim:

1. An engine starter including a drive or transmission having a centrally located driving member mounted for longitudinal movement to engage a member of the engine to be started and for rotary movement for cranking such engine member, a rotatable inertia device operatively connected with such drive, and a motor operatively connected with the inertia device for operating it for the starting operation, said driving member, inertia device and motor having the same axis of rotation.

2. An engine starter including a drive or transmission having a centrally located driving member mounted for longitudinal movement to engage a member of the engine to be started and for rotary movement for cranking such engine member, a rotatable inertia device operatively connected with such drive, and a motor operatively connected with the inertia device for operating it for the starting operation, said driving member, inertia device and motor having the same axis of rotation and being arranged in tandem.

3. An engine starter including a drive or transmission having a centrally located driving member mounted for longitudinal movement to engage a member of the engine to be started and for rotary movement for cranking such engine member, a flywheel operatively connected with such drive, and an electric motor operatively connected with the flywheel, said driving member, flywheel and the armature of the motor having the same axis of rotation.

4. An engine starter including a drive or transmission having a centrally located driving member mounted for longitudinal movement to engage a member of the engine to be started and for rotary movement for cranking such engine member, a flywheel operatively connected with such drive, and an electric motor operatively connected with the flywheel, said driving member, flywheel and the armature of the motor having the same axis of rotation and being arranged in tandem.

5. An engine starter including a drive or transmission having a centrally located driving member mounted for longitudinal movement to engage a member of the engine to be started and for rotary movement for cranking such engine member, reduction means operatively connected with the drive, a flywheel operatively connected with the reduction means and acting as an inertia means, and an electric motor which is operatively connected with the flywheel and whose armature has its axis in line with the axes of the drive, flywheel and reduction means.

6. An engine starter including a drive or transmission having a centrally located driving member mounted for longitudinal movement to engage a member of the engine to be started and for rotary movement for cranking such engine member, reduction gearing operatively connected with the drive and having its axis of rotation in line with that of said driving member, a flywheel operatively connected with the reduction gearing and having its axis of rotation in line with those of the driving member and reduction gearing, said reduction gearing including an internal gear having a hub and manually operated means including a pair of constantly meshed gears operatively connected with said hub, one of said gears having its axis of rotation at right angles to that of said gear.

7. An engine starter including a drive or transmission having a centrally located driving member mounted for longitudinal movement to engage a member of the engine to be started and for rotary movement for cranking said engine member reduction gearing operatively connected with the drive and having its axis of rotation in line with that of said driving member, a flywheel operatively connected with the reduction gearing and having its axis of rotation in line with those of the driving member and reduction gearing, said reduction gearing including an internal gear having a hub, an electric motor operatively connected with said gear, and manually operated means including a cranking shaft which is operatively connected with said hub and which has its axis of rotation at right angles to that of said gear.

8. An engine starter including a drive or transmission having a centrally located driving member mounted for longitudinal movement to engage a member of the engine to be started and for rotary movement for cranking such engine member, reduction gearing operatively connected with the drive and having its axis of rotation in line with that of said driving member, a flywheel operatively connected with the reduction gearing and having its axis of rotation in line with those of the driving member and reduction gearing, said reduction gearing including an internal gear having a hub, an electric motor which is operatively connected with the flywheel and whose axis of rotation is in line with those of the driving member and flywheel, and manually operated means including a cranking shaft which is operatively connected with said hub and which has its axis of rotation at right angles to that of said gear and said driving member.

9. An engine starter including a drive or transmission having a centrally located driving member mounted for longitudinal movement to engage a member of the engine to be started and for rotary movement for cranking such engine member, reduction gearing operatively connected with said drive, a casing in which such drive and gearing are mounted and contained and which has at one end extending bearing hubs, a flywheel having a central hub bearing in one of said hubs and an electric motor operatively connected with the flywheel.

10. A engine starter including a drive or transmission having a centrally located driving member mounted for longitudinal movement to engage a member of the engine to be started and for rotary movement for cranking such engine member, reduction gearing operatively connected with said drive, a casing in which such drive and gearing are mounted and contained and which has at one end extending bearing hubs, a flywheel having a central hub bearing in one of said hubs, an electric motor, and a shaft received within and operatively connected with the flywheel hub and operatively connected with the reduction gearing.

11. An engine starter including a drive or transmission having a centrally located driving member mounted for longitudinal movement to engage a member of the engine to be started and for rotary movement for cranking such engine member, reduction gearing operatively connected with said drive, a casing in which such drive and gearing are mounted and contained and which has at one end extending bearing hubs, a flywheel having a central hub bearing in one of said hubs, an electric motor operatively connected with the flywheel and the reduction gearing, and manually operated means also contained within said casing and operatively connected with the reduction gearing.

12. An engine starter including a drive or transmission having a centrally located driving member mounted for longitudinal movement to engage a member of the engine to be started and for rotary movement for cranking such engine member, reduction gearing operatively connected with said drive, a casing in which such drive and gearing are mounted and contained and which has at one end extending bearing hubs, a flywheel having a central hub bearing in one of said hubs, an electric motor operatively connected with the flywheel, and the reduction gearing, and manually operated means including a cranking shaft entering a side of the casing and operatively connected with the reduction gearing.

13. An engine starter including a drive or transmission having a centrally located driving member mounted for longitudinal movement to engage a member of the engine to be started and for rotary movement for cranking such engine member, reduction gearing operatively connected with said drive, a casing in which such drive and gearing are mounted and contained and which has at one end extending bearing hubs, a flywheel having a central hub bearing in one of said hubs and having a rim overhanging said hubs on the casing, a supplemental casing which encloses said flywheel, and an electric motor secured to said supplemental casing and operatively connected with the flywheel hub and gearing.

14. An engine starter including a drive or transmission having a driving member movable to engage a member of the engine to be started for the purpose of cranking such engine member, reduction gearing operatively connected with said drive, a casing in which such drive and gearing are mounted and contained and which has at one end extending bearing hubs, a flywheel having a central hub bearing in one of said hubs, said reduction gearing including an internal gear, a driving gear having a pinion meshing with said internal gear, and a driving shaft which has a pinion meshing with said driving gear and which is operatively connected with the flywheel hub, and an electric motor operatively connected with said driving shaft.

15. An engine starter including a drive or transmission having a driving member movable to engage a member of the engine to be started for the purpose of cranking such engine member, reduction gearing operatively connected with said drive, a casing in which such drive and gearing are mounted and contained and which has at one end extending bearing hubs, a flywheel having a central hub bearing in one of said hubs, said reduction gearing including an internal gear, a driving gear having a pinion meshing with said internal gear, and a driving shaft which has a pinion meshing with said driving gear and which is operatively connected with the flywheel hub, and an electric motor operatively connected with said driving shaft, and manually operated means also contained within said casing and operatively connected with said internal gear.

16. An engine starter including a drive or transmission having a driving member movable to engage a member of the engine to be started for the purpose of cranking such engine member, reduction gearing operatively connected with said drive, a casing in which such drive and gearing are mounted and contained and which has at one end extending bearing hubs, a flywheel having a central hub bearing in one of said hubs, said reduction gearing including an internal gear, a driving gear in the form of a bell, with a peripheral gear and a central pinion which meshes with the internal gear, said driving gear bearing in one of said hubs of the casing, and a driving shaft which has a pinion meshing with said peripheral gear and which is operatively connected with the flywheel hub, and means for operating said gearing.

17. An engine starter including a drive or transmission having a driving member movable to engage a member of the engine to be started for the purpose of cranking such engine member, reduction gearing operatively connected with said drive, a casing in which such drive and gearing are mounted and contained and which has at one end extending bearing hubs, a flywheel having a central hub bearing in one of said hubs, said reduction gearing including an internal gear, a driving gear in the form of a bell with a peripheral gear and a central pinion which meshes with the internal gear, said driving gear bearing in one of said hubs of the casing, and a driving shaft which has a pinion meshing with said peripheral gear and which is operatively connected with the flywheel hub, and means for operating said gearing comprising an electric motor operatively connected with said driving shaft.

18. An engine starter including a drive or transmission having a driving member movable to engage a member of the engine to be started for the purpose of cranking such engine member, reduction gearing operatively connected with said drive, a casing in which such drive and gearing are mounted and contained and which has at one end extending bearing hubs, a flywheel having a central hub bearing in one of said hubs, said reduction gearing including an internal gear, a driving gear in the form of a bell with a peripheral gear and a central pinion which meshes with the internal gear, said driving gear bearing in one of said hubs of the casing, and a driving shaft which has a pinion meshing with said peripheral gear and which is operatively connected with the flywheel hub, and means for operating said gearing comprising manually operated means mounted in the casing and operatively connected with said internal gear.

19. An engine starter including a drive or transmission having a centrally located driving member mounted for longitudinal movement to engage a member of the engine to be started and for rotary movement for cranking such engine member, reduction gearing operatively connected with the drive and having its axis of rotation in line with that of the said driving member, a flywheel operatively connected with the reduction gearing and having its axis of rotation in line with those of the driving member and reduction gearing, said reduction gearing including an internal gear having a hub, an electric motor which is operatively connected with the flywheel and whose axis of rotation is in line with those of the driving member and flywheel, and manually operated means including a cranking shaft which is operatively connected with said hub and which has its axis of rotation at right angles to that of said gear and said driving member, said electric motor being arranged to drive when energized said flywheel and gearing but to be operatively disconnected therefrom when such gearing is driven by the manual means.

20. An engine starter including a drive or transmission having a centrally located driving member mounted for longitudinal movement to engage a member of the engine to be started and for rotary movement for cranking such engine member, said driving member comprising a main portion and a clutch portion having relative longitudinal movement, one with respect to the other, said clutch portion having a shell splined to the main portion, a rotatable driving barrel encompassing said driving member, and concentric therewith, a nut threaded on said main portion of the driving member and having a shell extension, and a friction clutch including plates which are splined respectively to said shell extension and the interior of the barrel.

21. An engine starter including a drive or transmission having a centrally located driving member mounted for longitudinal movement to engage a member of the engine to be started and for rotary movement for cranking such engine member, said driving member comprising a main portion and a clutch portion having relative longitudinal movement, one with respect to the other, said clutch portion having a shell splined to the main portion, a rotatable driving barrel encompassing said driving member, and, concentric therewith, a nut threaded on said main portion of the driving member and having a shell extension and a friction clutch including plates which are splined respectively to said shell extension and the interior of the barrel and spring means for applying pressure to said plates.

22. An engine starter including a drive or transmission having a centrally located driving member mounted for longitudinal movement to engage a member of the engine to be started and for rotary movement for cranking such engine member, said driving member comprising a main portion and a clutch portion having relative longitudinal movement, one with respect to the other, said clutch portion having a shell splined to the main portion, a rotatable driving barrel encompassing said driving member and, concentric therewith, a nut threaded on said main portion of the driving member and having a shell extension, and means for operatively connecting the barrel and the nut, said clutch portion of the driving member being arranged to bear against and be stopped by said nut.

23. An engine starter including a drive or transmission having a centrally located driving member mounted for movement to engage a member of the engine to be started, and for rotary movement for cranking such engine member, and a rotatable driving barrel encompassing said driving member and operatively connected therewith, said barrel having a closed end integral therewith, and driving means operatively connected with said end of the barrel.

24. An engine starter including a drive or transmission having a centrally located driving member mounted for movement to engage a member of the engine to be started and for rotary movement for cranking such engine member, and a rotatable driving barrel encompassing said driving member and operatively connected therewith, said barrel having a closed end integral therewith and reduction gearing attached directly to said end of the barrel for driving it.

25. An engine starter including a drive or transmission having a centrally located driving member mounted for movement to engage a member of the engine to be started for the purpose of cranking such engine member, and a rotatable driving barrel encompassing said driving member and operatively connected therewith, said barrel having one end closed, and provided with a central hub and reduction gearing, including a rotatable gear having a hub mounted upon and secured to said hub of the barrel and gears acting between said gear hub and the barrel.

26. An engine starter including a drive or transmission having a centrally located driving member mounted for movement to engage a member of the engine to be started and for rotary movement for cranking such engine member, a rotatable inertia device operatively connected with such drive and a motor operatively connected with the inertia device for operating it for the starting operation, said driving member and inertia device having the same axis of rotation.

27. An engine starter including a drive or transmission having a centrally located driving member mounted for movement to engage a member of the engine to be started for the purpose of cranking such engine member, a rotatable inertia device operatively connected with such drive, means for operating the inertia device, and a casing made in two parts connected together, said drive being contained as an assembly in one of said parts of the casing and the inertia device being contained as an assembly in the other of said parts of the casing.

28. An engine starter including a drive or transmission having a centrally located driving member mounted for movement to engage a member of the engine to be started and for the purpose of cranking such engine member, reduction means operatively connected with the drive, a flywheel operatively connected with the reduction means, means for operating the flywheel, and a casing made in two parts connected together, said drive and reduction means being an assembly contained within one of said parts of the casing, and the flywheel and its operating connections with the reduction means being an assembly separate from the other assembly and contained within the other one of said parts of the casing.

29. An engine starter including a drive or transmission having a centrally located driving member mounted for movement to engage a member of the engine to be started but normally out of engagement therewith and also mounted for rotary movement for cranking such engine member, a rotatable inertia device operatively connected with such drive, means extending through said driving means for actuating the driving member into engagement with the engine member, and a power means operatively connected with the inertia device for operating it for the starting operation, said driving member, inertia device and power means having the same axis of rotation, and said actuating means lying in said axis.

30. An engine starter including a drive or transmission having a centrally located driving member mounted for longitudinal movement to engage a member of the engine to be started but normally out of engagement therewith and also mounted for rotary movement for cranking such engine member, a rotatable inertia device operatively connected with such drive, means for actuating the driving member into engagement with the engine member, and a power means operatively connected with the inertia device for operating it for the starting operation, said driving member, inertia device and power means having the same axis of rotation, said actuating means including a longitudinally movable rod operatively connected with the driving member lying in said axis.

31. An engine starter including a drive or transmission having a centrally located driving member mounted for longitudinal movement to engage a member of the engine to be started but normally out of engagement therewith and also mounted for rotary movement for cranking such engine member, a rotatable inertia device operatively connected with such drive, means for actuating the driving member into engagement with the engine member, and a power means operatively connected with the inertia device for operating it for the starting operation, said driving member, inertia device and power means having the same axis of rotation, said actuating means including a longitudinally movable rod passing centrally through the driving member and operatively connected therewith and also lying in said axis.

32. An engine starter including a drive or transmission having a driving member mounted for movement to engage a member of the engine to be started but normally out of engagement therewith and also mounted for rotary movement for cranking such engine member, a rotatable inertia device operatively connected with such drive, means for operating the inertia device, and means extending through the driving member and operatively connected therewith for actuating it, said driving member and inertia device having the same axis of rotation and said means for actuating said driving member lying in said axis.

33. An engine starter including a drive or transmission having a driving member mounted for longitudinal movement to engage a member of the engine to be started but normally out of engagement therewith and also mounted for rotary movement for cranking such engine member, a rotatable inertia device operatively connected with such drive, manually operated means for operating the inertia device and means disposed partly within the driving member and operatively connected therewith for actuating it, said driving member and inertia device having the same axis of rotation and said means which actuates the driving member lying in said axis and said manually operated means which operates the inertia device being at right angles to said axis.

34. An engine starter including a drive or transmission having a centrally located driving member mounted for movement to engage a member of the engine to be started but normally out of engagement therewith and also mounted for rotary movement for cranking such engine member, a rotatable inertia device operatively connected with such drive, means extending through the driving member for actuating the driving member into engagement with the engine member, and a power means operatively connected with the inertia device for operating it for the starting operation, said driving member, inertia device and power means having the same axis of rotation, and said actuating means lying in said axis.

35. An engine starter including a drive or transmission having a centrally located driving member mounted for movement to engage a member of the engine to be started but initially out of engagement therewith and also mounted for rotary movement for cranking such engine member, a rotatable inertia device operatively connected with such drive, means for controlling the driving member in its movement into engagement with the engine member, and a power means operatively connected with the inertia device for operating it for the starting operation, said driving member, inertia device and power means having the same axis of rotation, said controlling means including a longitudinally movable rod operatively connected with the driving member and lying in said axis.

36. An engine starter including a drive or transmission having a centrally located driving member mounted for movement to engage a member of the engine to be started but normally out of engagement therewith and also mounted for rotary movement for cranking such engine member, a rotatable inertia device operatively connected with such drive, means for controlling the driving member in its movement into engagement with the engine member, and a power means operatively connected with the inertia device for operating it for the starting operation, said driving member, inertia device and power means having the same axis of rotation, said controlling means including a longitudinally movable rod passing centrally through the driving member and operatively connected therewith and also lying in said axis.

37. An engine starter including a drive or transmission having a centrally located driving member mounted for movement to engage a member of the engine to be started but initially out of engagement therewith and also mounted for rotary movement for cranking such engine member a rotatable inertia device operatively connected with such drive, means disposed partly within the driving member for controlling the driving member in its movement into engagement with the engine member, and a power means operatively connected with the inertia device for operating it for the starting operation, said driving member, inertia device and power means having the same axis of rotation, and said controlling means lying in said axis.

38. In an engine starter, a driving member mounted for movement to engage a member of the engine to be started and also mounted for rotary movement for cranking such engine member, a rotatable inertia device operatively connected with such driving member, means for controlling the movement of the driving member into engagement with the engine member including a longitudinally movable rod operatively connected with the driving member and lying in the axis of rotation of said inertia device, and means operatively connected to the inertia device for operating it to store energy therein for the starting operation.

39. An engine starter including driving means movable to engage a member of the engine to be started and rotatable to crank said engine member, means for storing energy for the starting operation, said storing means comprising a flywheel having its axis of rotation in line with that of said driving means, manually operable means for actuating said storing means comprising a cranking shaft operatively connected thereto, and a yieldable driving connection between said flywheel and driving means comprising a plurality of rotatable friction members disposed coaxially with respect to said flywheel and driving means.

40. An engine starter including driving means movable to engage a member of the engine to be started and rotatable to crank said engine mechanism, a rotatable inertia device operatively connected with said driving means, means for operating said inertia device, and a casing made in at least two parts connected together, said driving means being contained as an assembly in one of said parts of the casing and said inertia device being contained as an assembly in another of said parts of the casing.

In testimony whereof I have signed this specification.

RAYMOND P. LANSING.